Sept. 26, 1961 G. KIS ET AL 3,002,093
INFRARED NAVIGATION SYSTEM
Filed Jan. 29, 1959 2 Sheets-Sheet 1

INVENTORS:
Melvin H. Murphy
George Kis
By Smyth & Roston
Attorneys

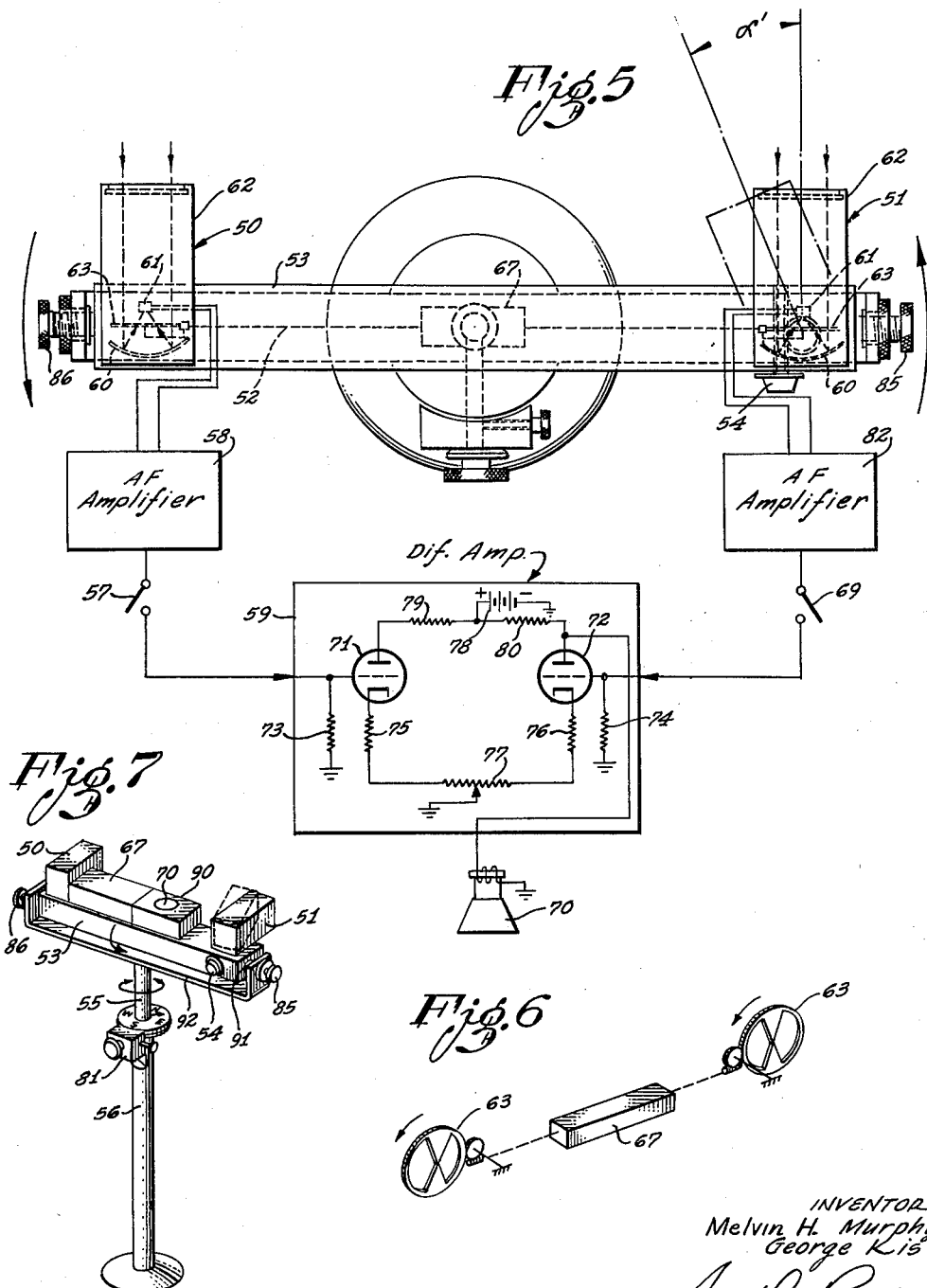

United States Patent Office 3,002,093
Patented Sept. 26, 1961

3,002,093
INFRARED NAVIGATION SYSTEM
George Kis, Santa Monica, and Melvin H. Murphy, Encino, Calif., assignors to Packard Bell Electronics Corporation, Los Angeles, Calif., a corporation of California
Filed Jan. 29, 1959, Ser. No. 789,855
7 Claims. (Cl. 250—83.3)

This invention relates to apparatus for determining the bearing and range of obscured and invisible objects and, more particularly, to navigation apparatus utilizing infrared radiation detection equipment.

In general, the various heretofore successful aids to navigation utilize the reflection of radio waves or the reflection of sound waves to determine the bearing and range of an object. These aids require elaborate, bulky and expensive instruments which are impractical for installation on small water craft. The instruments, moreover, have relatively large power requirements and, therefore, often utilize the main power supply of the ship or craft. If the main power supply fails, the instrument becomes disabled just at a time when it may be most needed. For these reasons, and also because many small water craft do not have power supplies suitable for powering navigation instruments, small water craft generally do not carry adequate aids for navigation after nightfall and for navigation in heavy fog when landmarks are obscure and invisible.

In illustrative embodiments of this invention, the approximate bearing or distance of an object above water from a small water craft is rapidly determined by detecting the infrared radiation from the object. It is well known that all matter radiates heat or infrared radiation at some wave length whenever its surrounding medium is cooler. Objects above water will generally be warmer than the surrounding water even after nightfall because of the retained heat of the sun. It is this natural, or retained, infrared radiation, and not a reflected radiation from a source of infrared radiation on the water craft, that is detected in order to minimize the power requirements, bulk and cost of the navigation apparatus.

When the relatively low energy infrared radiation is detected, it is important to avoid any material attenuation of the radiation from the object. Attenuation, however, takes place both in the atmosphere and in the navigation instrument detecting the infrared radiation. The atmosphere, especially when high humidity and fog conditions exist, materially attenuates much of the infrared band width. A feature of this invention relates to the utilization of infrared ray detecting means which is sensitive only to a pre-determined small portion of the infrared band width. This pre-determined portion of the infrared band width is not materially attenuated by fog or other obscuring atmospheric conditions. Material attenuation in the navigation instrument itself takes place whenever the infrared radiation from the object is transmitted through a lens. The infrared radiation can be reflected, focused and controlled in a beam pattern even though it is invisible because it behaves very much like visible light. To be more specific, infrared radiation is a term utilized to identify electro-magnetic radiation having wavelengths longer than deep red in the visible spectrum, at 7,800 angstrom units and up to 1,500,000 angstrom units, in the microwave spectrum. Any of the conventional lenses for focusing infrared radiation even when made of relatively low insertion loss materials such as sapphire, germanium or silicon materially attenuate the low energy infrared radiation. Another feature of this invention pertains, therefore, to the provision of infrared navigation apparatus in which the infrared radiation is not transmitted through lenses.

In one specific embodiment of this invention, the navigation instrument includes a number of infrared reflective surfaces which are mounted along a base line on a supporting member to provide a double infrared image of an observed object to an infrared converter. The infrared reflective surfaces do not materially attenuate the infrared radiation and are less expensive and more durable than lenses. The infrared converter converts the double infrared image to a double visible image which is viewed by the navigator through an optical system. In order to determine the range of an object, the supporting member is rotated about a vertical axis until a first half of an image of the observed object is provided to the navigator by way of a number of the reflective surfaces fixed on the supporting member. Thereafter, another one of the reflective surfaces, rotatable on the supporting member, is adjusted to align the second half of the image with the first. A knob or dial utilized to rotate the rotatable surface is calibrated to provide a direct indication of the range of the observed object from the navigation instrument when the two halves of the image are aligned.

In another specific embodiment of this invention, the navigation instrument is aligned by utilizing audible instead of visible indications in order to free the vision of the navigator during alignment. The instrument includes two infrared ray detector assemblies mounted at the ends of a supporting member with one of the assemblies being fixed and the other of the assemblies being rotatable with respect to the member. Each of the assemblies includes a detector cell and means for limiting the sensitivity of the cell to a narrow beam of infrared radiation. A concave reflective surface is utilized to focus the narrow beam to the detector cell.

To determine the range of an object from the apparatus, the rotatable assembly is disabled and the stationary assembly is pointed towards the object by rotating the supporting member about its vertical axis. The stationary assembly converts the infrared rays to an audio signal utilizing mechanical interrupting means which modulates the infrared rays to the assembly by interrupting them at an audio frequency rate. The magnitude of the audio signal is proportional to the magnitude of the infrared rays received at the assembly. The audio signals are supplied through a differential amplifier to an electro-mechanical transducer which converts the signals to an audible tone. When the stationary assembly is pointed directly at the object, the volume of the audible tone is at its maximum. The rotatable assembly is thereupon enabled to provide another audio signal to the differential amplifier which cancels part of the audio signal from the stationary assembly so that the audible tone provided by the transducer is lower in volume when both assemblies are operating. The rotatable assembly is rotated until a null, or low volume point, is detected in the audible tone. A dial, by which the rotatable assembly is rotated, is calibrated to directly read the range.

A further feature of this invention relates to the provision of means for readily determining if both assemblies are pointed at the same object. Generally, there are a number of objects in the field of view and the assemblies at the ends of the supporting member are occasionally pointed at different objects. The supporting member is rotated about its longitudinal axis, or base line, to determine if the same object is being viewed by both assemblies. If both assemblies are pointed at the same object, the volume provided by the transducer does not change materially as the supporting member is rotated, until the two assemblies no longer receive infrared radiation from the observed object. At that point, an audible tone is no longer provided from the transducer. If the audio tone, however, varies in volume as the supporting member is rotated, then either the two assemblies are pointed at two different objects or the infrared radiation from the object varies with elevation. To determine which of these two situations exists, the two assemblies are alternately disabled. If they are both pointed at the same object, the audio tone volume provided from each assembly is the same for each angular position of the supporting member. If the volume for one assembly reduces to zero and from the other does not vary materially, two objects of different heights are being viewed respectively by the two detectors. In this manner, a positive method of determining whether the two assemblies are focused on the same object is provided utilizing only aural communication.

Further advantages of this invention will become apparent upon consideration of the following description when considered in conjunction with the drawings wherein.

FIGURE 5 provides a top plan view of the mechanical features of a second embodiment of the navigation instrument constituting this invention and further provides a circuit diagram of this second embodiment wherein adjustable infrared detector assemblies function to provide an audio indication of the radiation of an observed object;

FIGURE 6 is a perspective view of the synchronously operated interrupters which are included in the second embodiment of the navigation instrument of this invention; and FIGURE 7 is a perspective view of the second embodiment of this invention.

Figure 1A:
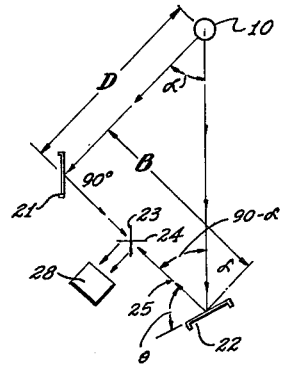
FIGURE 1a is a diagram illustrating the theory of operation of the navigation instruments of this invention.
Figure 1:
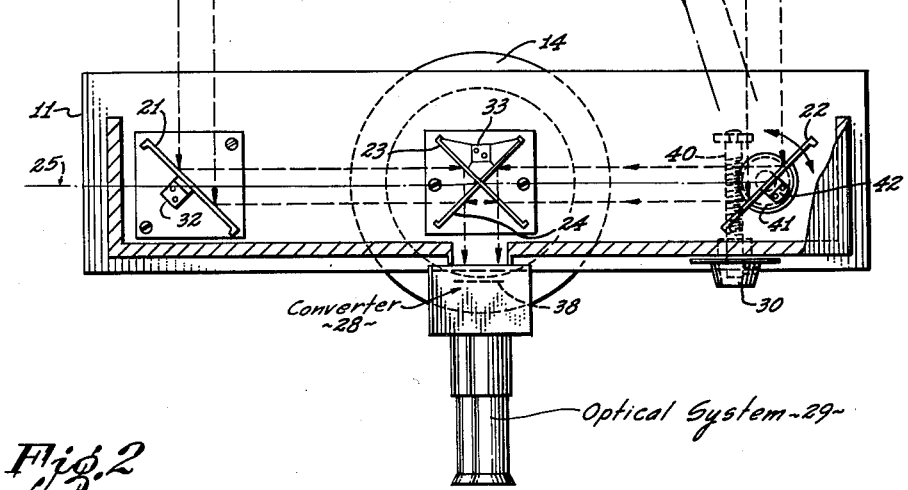
FIGURE 1 is a partly in section, top view, of a first embodiment of the navigation instrument in this invention wherein an adjustable infrared optical system supplies a double image to an infrared converter.
Figure 2:
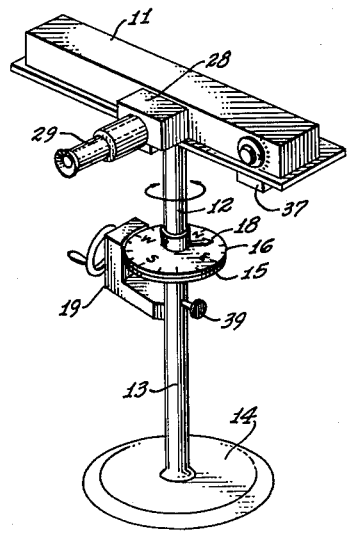
FIGURE 2 is a perspective view of the first embodiment of the navigation instrument of this invention as seen from a position in front of and above the instrument.

Referring to FIGURES 1 and 2, a navigation instrument is shown which utilizes the infrared radiation from an observed object, or target, to determine its bearing and range from the instrument. The instrument includes a rectangular housing 11 which is supported by a cylindrical column 12. The column 12 is rotatably disposed in a tubular pedestal 13 which has a mounting flange 14 and a flange 15. The mounting flange 14 may be affixed to a portion of the ship or craft, not shown, which carries the instrument. The orientation of the housing 11 is indicated by the relative disposition of a pointer 18 and a compass card 16. The pointer 18 is coupled to the tubular housing 12 for rotary movement with the housing 11, and the compass card 16 is supported on the flange 15 and fixed in azimuth, or against rotation, by a clamp 19.

The housing 11 supports and partially encloses four mirrors 21, 22, 23 and 24 along a base line 25 which is the longitudinal and horizontal axis of the housing 11. The infrared radiation from an observed object is reflected by the two mirrors 21 and 22 and then by the other two mirrors 23 and 24 to an infrared image converter 28, which converts the infrared radiation to visible radiation. As will be hereinafter described, the visible radiation is viewed by the navigator during the alignment of the navigation instrument.

As shown in FIGURE 1a, the infrared radiation from an object 10 may be reflected by the mirror 21 to the mirror 23 and therefrom to the converter 28. The mirrors 23 and 24 form a rectangular cross, as shown also in FIGURE 1, with the mirror 24 being mounted above the mirror 23. The mirrors 21, 23 and 24 are stationary with respect to the housing 11, being mounted thereon by means of the brackets 32 and 33, but the mirror 22 is rotatably mounted on the housing 11. The reflective surfaces of the mirrors 21 and 23 face each other and the reflective surfaces of the mirrors 22 and 24 face each other.

With the mirror 23 positioned across the lower half of the housing 11 and the mirror 24 positioned across the upper half of the housing 11, each respectively reflects only one half of the infrared image from the mirrors 21 and 22. In this manner, a double or split image of the object 10 is provided to the converter 28, the upper half of the image by means of the mirrors 22 and 24, and the lower half by means of the mirrors 21 and 23.

Figure 4:
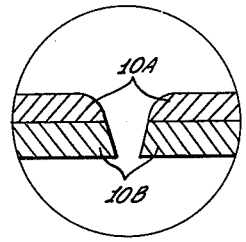
FIGURE 4 is a view seen by the navigator utilizing the first embodiment of the navigation instrument of this invention after the range of an observed object has been determined.

In FIGURE 4, which illustrates the view provided to the navigator when the mirrors 21 and 22 are aligned with respect to the object 10, the upper half 10A of the object 10 may be presented to the navigator by way of the mirrors 21 and 23, and the lower half 10B of the object may be presented to the navigator by way of the mirrors 22 and 24. The mirrors 21, 22, 23 and 24 may have a first surface coating which is highly reflective in the infrared range. When gold, for example, is utilized, the coefficient of reflection is .98 and the reflection is selective in that visible radiation is attenuated. By attenuating the visible radiation, the signal-to-noise ratio is improved, with the signal being the detectable infrared radiation band and the noise being the rest of the electro-magnetic radiation including the visible spectrum.

The gold reflective surfaces are very even so that little scatter of the infrared radiation occurs. The attenuation, therefore, of the infrared radiation through the reflective optical system to the converter 28 is negligible. If lenses are utilized instead of reflective surfaces, the attenuation is material because even with low insertion loss lens materials, such as sapphire, silicon, rubber and germanium, the insertion loss approaches ten percent for each lens. Considering that the infrared radiation from the observed object may be weak, the cumulative attenuation of the radiation through the atmosphere and navigation instrument may result in insufficient radiation for detection by the converter 28.

As indicated above, the converter 28 is a device for converting infrared radiation to visible radiation. It includes a sensor or sensitive surface 38 which emits electrons in quantities proportional to the strength of the infrared rays striking any part of the surface 38. The electrons are attracted to a fluorescent material, not shown, in the converter 28 which emits a visible glow when electrons strike it. Electric potential required to adequately accelerate the electrons is furnished by batteries (not shown) in a power supply 37 shown in FIGURE 2. Converters of this general type are old in the art as exemplified by Sternglass Patent 2,788,452 which issued on April 9, 1957. The surface 38 in the converter 28, however, is made of material which is sensitive to a narrow band of the infrared spectrum.

Though the object 10 emits radiation throughout the infrared spectrum, the atmosphere selectively attenuates the spectrum, especially when heavy fogs exist. In effect, infrared windows of narrow band widths are provided by the atmosphere. One of these windows exists from 3 to 4 microns wavelength, which is 30,000–40,000 angstrom units. Some attenuation, of course, exists even when an atmospheric window is utilized. The sensors 38, which may be designed specifically for sensitivity to wavelengths in this range, may be of lead telluride or silver caesium oxide or other material sensitive to the rays falling in one of the atmosphere windows. By specially designing the converter 28 in this manner, the detection efficiency is large.

The image converter 28 can detect radiant energy of a few milliwatts. The radiant energy emitted by an object depends upon the nature of the object and its temperature. As the temperature increases, the rate of radiation increases very rapidly, in proportion to the fourth power of the absolute temperature of the object. The nature of the object determines its emissivity which in general is larger for rough and darker surfaces and smaller for smooth and light surfaces. The rate of emission of radiant energy of a body is directly proportional to its emissivity. The amount of radiant energy which is provided to the converter 28, therefore, depends upon the temperature of the object 10 relative to the temperature of the surrounding water and the navigation instrument, the type of surface of the object 10, the distance the object 10 is from the instrument because the radiation is hemispheric in all directions, the atmospheric conditions, and the attenuation at the reflective surfaces of the mirrors 21, 22, 23 and 24. For an average grey object that may be found in harbors and along waterfronts at a temperature of 20 degrees centigrade, the rate emission may be 0.4 watt per centimeter squared per hemisphere. The image converter 28 can provide an adequate visible image of such an object at a distance of a few hundred yards.

The navigator views the observed object on the fluorescent screen of the converter 28 by utilizing an optical system 29. The optical system 29, which may have an amplifying factor of approximately three, reduces the field of view to an angle of 2 degrees or less to effectively reduce the useful signal to noise ratio of the instrument. A normal visible light optical system including lenses may be utilized because the infrared image was converted to light which is not materially attenuated by the optical system 29.

In order to determine the bearing of an object, the housing 11 is rotated with the cylindrical column 12 about the vertical axis of the column 12 until the lower half of an image of the observed object is centered in the view of the navigator. With the housing 11 oriented so that the lower half of the image of the observed object is centered, the pointer 18, which rotates with the housing 11, indicates on the compass card 16 the bearing of the object.

Figure 3:
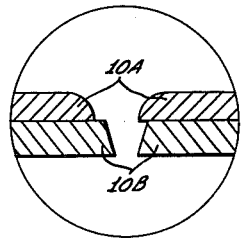
FIGURE 3 is a view seen by a navigator utilizing the first embodiment of the navigation instrument of this invention before the range of an observed object has been determined.

To determine the range of the object 10, the lower half of the image of the object is centered by rotating the housing 11. When the lower half of the image is centered, a clamp 39 is utilized to lock the shaft 12 against rotation in the pedestal 13. The mirror 22 is thereupon manually rotated by operating a calibrated dial 30 which is mounted with a worm wheel 40 on the housing 11. The worm wheel 40 is rotated with the dial 30 to mesh with a worm gear 41 to which the mirror 22 is affixed by a bracket 42. The rotation of the mirror 22 adjusts the upper half of the image provided to the converter 28. FIGURE 3 illustrates the view of an object 10 before alignment and FIGURE 4 illustrates the view after alignment. Viewing the double reflection, any vertical line on the viewed object 10 is imaged as a continuous line when the two reflections are aligned which is when the range can be determined. The angle $\theta$ between the plane of the mirror 22 and the base line 25 is proportional to the distance of the object 10 from the base line 25. Referring specifically to FIGURE 1a, the distance D from the object 10 to the base line 25 equals the distance B between the two mirrors 21 and 22 at the base line 25 multiplied by the cotangent of angle $\alpha$, the angle between the two beams of rays from the object 10 to the mirrors 21 and 22 ($D = B$ cotangent $\alpha$).

The angle of reflection, which is also the angle between the plane of the mirror and the base line 25, varies inversely with the angle $\alpha$ as follows: $\alpha = 180 - 2\theta$. The further away the object 10 is from the base line 25 or the larger is the distance D, the smaller is the angle $\alpha$ and the larger is the angle $\theta$. The range, therefore, is proportional to the angle which the plane of the mirror 22 makes with the base line 25 so that the dial 30 can be calibrated to directly read the range. In this manner, the range of an object can be readily determined by utilizing the infrared radiation from the object.

The image converter 28 has a sensitivity of a few milliwatts of radiant energy because it provides a visible image. In the embodiment shown in FIGURES 5, 6 and 7 a visible image is not utilized and, in fact, the navigator can look about during the time he is aligning the navigation instrument. The only time the navigator need look at the instrument is after it is aligned to take the reading of the range. Moreover, by not utilizing a visible image, detectors sensitive to approximately 100 micromicro watts of radiant energy may be utilized so that ranges up to a few miles may be determined.

In the embodiment shown in FIGURES 5, 6 and 7, an audible indication is provided of the relative strength of the infrared radiation received by two infrared detector assemblies 50 and 51 which are spaced at opposite ends of the longitudinal axis 52 of the housing 53. By providing an audible indication, the vision of the navigator is free for other functions during the time that he is aligning the instrument to determine the range of the obscured object. The housing 53 is rotatable about its central transverse axis since it is supported on a shaft 55 which is rotatably supported in a pedestal 56. The detector assembly 50 is fixed with respect to the housing 53 but the detector assembly 51 is rotatable, as indicated by the dash lines in FIGURE 5, with respect to the housing 53. The detector assembly 51 is rotated, utilizing the calibrated dial 54.

Each of the assemblies 50 and 51 includes a hollow cylindrical body 62 which limits the sensitivity of the assembly to a narrow beam of infrared radiation. The assemblies 50 and 51 are, in this manner, directionally responsive to the infrared radiation. The infrared radiation which passes longitudinally into the body 62 is focused by the highly reflective concave gold surface 60 to a detector cell 61. The surface of mirror 60 is of gold because, as described above, gold is highly reflective to infrared radiation and it attenuates visible radiation. The detector cell 61 is a device which produces a current proportional to the infrared radiant energy detected thereby somewhat as a photoelectric cell converts variable radiation to an electric current. The detecting surface (not shown) in the cell 61 is sensitive to a narrow band of the infrared spectrum. Only a small band of infrared radiation is utilized because, as described above, the atmosphere selectively attenuates the infrared radiation transmitted through it. When lead telluride or silver caesium is utilized, the cell 61 is sensitive to radiation having a wavelength between 3 and 4 microns. This narrow band is not materially attenuated through the atmosphere.

A loss of energy in converting the infrared radiation to a visible image is avoided in the cell 61 so that its effective attenuation of the signal may be considerably less than that occurring in the converter 28. The sensitivity of the cell 61 can be further improved by cooling it to increase the temperature differential between it and the observed object. Positioned between the surface 60 and the detector cell 61 is an interrupter or a chopper 63 which is shown more particularly in FIGURE 6. The interrupter 63 interrupts the infrared radiation reflected to the detector cell 61 and interrupts this radiation at an audio frequency rate so that the detector cell 61 provides an audio frequency signal. The audio frequency is desirable because it can be readily amplified and because an audible tone is provided to the navigator.

The interrupter 63 is divided into four sectors, two of which transmit and two of which block the radiation to the cell 61. With the transmitting portions of the interrupter 63 shaped as sectors, substantially all the radiation into the body 62 is reflected to the cell 61 when the interrupter 61 is in a transmitting position so that attenuation by the interrupter 63 is negligible. The two interrupters 63, one in the assembly 50 and the other in the assembly 51, are synchronously driven by the motor 67 so as to be in phase. The two interrupters 63 block the respective infrared radiation on a synchronous basis in alternate sectors and transmit the infrared radiation on a synchronous basis in the other sectors.

The signals provided from the two detectors 61 in the assemblies 50 and 51 are amplified, respectively, by the amplifiers 58 and 82 and supplied, when the switches 57 and 69 are closed, to a differential amplifier 59. With the switch 69 open, the differential amplifier 59 functions merely as a normal amplifier to drive a speaker 70 which is connected thereto. When a signal is provided to both inputs of the differential amplifier 59, the output of the amplifier is the difference therebetween. The amplifiers 58, 82 and 59, together with the speaker 70, are located in a unit housing member 90 which is mounted on the housing 53.

The differential amplifier 59 includes two triodes 71 and 72, the grids of which are respectively connected to contacts of the switches 57 and 69 and to the grounded resistors 73 and 74. The cathodes of the tubes 71 and 72 are connected through the cathode resistors 75 and 76 to the opposite ends of a potentiometer 77, the center tap of which is grounded. Potential is respectively supplied to the anodes of the tubes 71 and 72 from a positive potential source 78 through the plate resistors 79 and 80. With the switch 57 closed and the switch 69 open, the speaker 70 provides an audible indication of the magnitude of the infrared radiation received by the detector assembly 50.

Each time a transmitting section of the interrupter 63 rotates in front of the cell 61, a pulse is coupled from the cell 61 through the amplifier 58 and the closed switch 57 to the grid of the tube 71 in the amplifier 59. The pulse, which is positive, provides for an increase in current through the tube 71, thereby raising the cathode potential of both tubes 71 and 72 so that the conduction through tube 72 decreases to provide a negative pulse to the speaker 70. The magnitude of the pulse to the speaker 70 is proportional to the magnitude of the radiation detected by the cell 61 of the assembly 50.

In order to determine the bearing and range of an object, the housing 53 is rotated by the navigator about its central transverse axis, with switch 57 closed and switch 69 open, until the volume of the audible signal reaches a maximum. With the volume of the audible signal at a maximum, the indicator 50 is pointed at the object for which the bearing and range is to be determined. The housing 53 is thereupon locked against rotation by a clamp 81. The pointer 66, shown in FIGURE 7, indicates the bearing of the object as the pointer rotates with the housing 53 and the shaft 55.

To determine the range, the housing 53 remains locked in position and the switch 69 is closed to enable the determination of the relative magnitude of the infrared radiation at the detector assemblies 50 and 51. As indicated above, the assembly 51 is rotated by the dial 54. With the switch 69 closed, the audio signal from the cell 61 in the assembly 51 is passed through the amplifier 82 and the switch 69 to the grid of the tube 72 in the differential amplifier 59.

Each of the positive audio frequency pulses from the amplifier 82 causes an increase of current through the tube 72 which is opposite in effect to the positive pulses from the amplifier 58. As described above, each of the pulses from the amplifier 58 causes an increase of the cathode potential of tube 72 so as to decrease the current through the tube and through the speaker 70. When a signal is introduced from the assembly 51 to the amplifier 59, the volume of the tone provided by the speaker 70 therefore decreases. As the assembly 51 is rotated, the volume of the signal produced by the speaker 70 decreases as the magnitude of the radiation passing into the assembly 51 approaches the magnitude of the radiation passing into the assembly 50.

If the potentiometer 77 is set with the variable contact at its center and the signals from the two amplifiers 58 and 82 are identical in magnitude, an audio frequency signal is not provided from the differential amplifier to the speaker 70. The potentiometer 77 is adjusted, however, so that a low point or null is provided instead of a zero point. In this manner, when the two detector assemblies 50 and 51 are pointed at the same object, a low point in the volume obtained from the speaker 70 is detected. When an audible null or valley point in the volume is heard, the dial 54 indicates the range of the observed object.

FIGURE 1a illustrates the theory of operation for the embodiment shown in FIGURES 5, 6 and 7 as well as for the embodiment shown in FIGURES 1 and 2. The assembly 51 is pointed along the line to the object 10 which forms an angle 90—α with the base line. The range, which equals the distance between the assemblies multiplied by the cotangent of angle α is inversely proportional to the angle X so that the dial 54, which determines the angle α can be calibrated to indicate the range.

The housing 53 is also rotatable about its longitudinal axis by operating two knobs 85 and 86 as well as about its vertical axis on the shaft 55. The knobs 85 and 86 are attached to a shaft 91 which is rotatably supported on a bracket 92. The bracket 92 is in turn supported on the rotatable shaft 55 and the housing 53 is mounted on, and rotates with, the shaft 91. By rotating the housing 53 about its longitudinal axis 52 through the shaft 91, the elevation angle of the two detector assemblies 50 and 51 is changed. The housing 53 is rotated about its longitudinal axis 52 in order to determine whether the two detector assemblies 50 and 51 are receiving infrared radiation from the same object as it is possible that they may be receiving infrared radiation from two different but relatively proximate objects.

If the two assemblies 50 and 51 are pointed at the same object, the radiation received at the assemblies 50 and 51 will decrease materially at a particular angle of elevation, when they no longer receive radiation from the object. The volume of the tone will therefore remain substantially the same until the assemblies 50 and 51 no longer point at the observed object.

If at any angle of elevation the volume increases materially, it indicates that the assemblies 50 and 51 are receiving radiation from two different objects, one of which is taller than the other. When this condition occurs, only one of the two bucking signals to the amplifier 59 is provided (from the taller of the two observed objects) so that larger pulses are provided to the speaker 70. This condition occurs only if two different objects are supplying the radiation respectively to the two assemblies.

When the assemblies 50 and 51 receive radiation from the same object, the volume does not materially change even if the magnitude of the radiation from the object changes with elevation. The volume does not change materially because it is only the difference voltage that is provided to the speaker 70. As the magnitude of the radiation from the object increases, the signals produced in the assemblies 50 and 51 both increase in magnitude by the same amount. This causes the signals produced in the assemblies 50 and 51 to be effectively cancelled at the differential amplifier 59. Since it is the setting of the potentiometer which essentially determines the volume at the null point, the magnitude of the radiation received at the assemblies 50 and 51 does not have an appreciable effect on the volume at the null point.

In order to check that the signals from the assemblies 50 and 51 differ materially, the switches 57 and 69 can be alternately opened and closed so that the volume due to their respective signal can be compared.

Although this application has been disclosed and illustrated with reference to particular applications, the principles involved are susceptible of numerous other applications which will be apparent to persons skilled in the art. For example, different mirror arrangements may be utilized to provide superimposed images instead of split or double images of the type described above in reference to FIGURES 3 and 4. By positioning two mirrors side by side to form a right angle instead of one above the other to form a cross as do the mirrors 23 and 24, a superimposed image is provided with which the instrument may be aligned. Another example is that electronic interrupters instead of the mechanical interrupters 63 may be utilized. An audio oscillator may be provided which drives two gates to function as an interrupter for the signal from the cells 61 instead of the mechanical arrangement. It is evident, therefore, that numerous other applications may be apparent without departing from the principles of this invention. The invention is, therefore, to be limited only as indicated by the scope of the appended claims.

We claim:

1. An infrared navigation instrument, including a pair of directionally responsive infrared detector cells spaced along a rotatable base line, one of said detector cells being fixed with respect to said base line and the other of said detector cells being rotatable with respect to said base line, means connected to said rotatable detector cell for indicating the distance from said base line of an object emitting infrared radiation, a pair of mechanical interrupters each mounted in front of a different one of said detector cells for interrupting the radiation from said object at an audio frequency rate, means coupled to said interrupters for synchronously operating said interrupters, a differential amplifier connected to said detectors for providing an electrical signal indicating the relative strength of the infrared radiation received from the object by said pair of detector cells, means coupled to the rotatable detector cell for disabling the signal provided by said rotatable detector cell whereby said differential amplifier provides a signal indicating the strength of the infrared radiation received from the object by said fixed detector cell, and an electro-mechanical transducer connected to said differential amplifier for providing an audible indication of the signal provided from said differential amplifier.

2. An infrared navigation instrument, including, a pair of detector assemblies spaced along a base line, one of said assemblies being fixed with respect to said base line and the other of said assemblies being rotatable with respect to said base line; means connected to said rotatable assembly for indicating the range of an object emitting infrared radiation; each of said assemblies including a detector cell sensitive to a particular narrow band of the infrared spectrum, means operative upon the radiation from the object for limiting the direction from which infrared radiation may be provided to said detector cells, and means operative upon the radiation introduced to each detector cell for periodically interrupting such radiation whereby the signal provided from said detector cell is an alternating current signal having a magnitude proportional to the magnitude of the infrared radiation received at said cell and a frequency equal to the frequency at which the radiation at said cell is interrupted; means coupled to said interrupting means for synchronously operating said interrupting means of said pair of assemblies; means coupled to said detector cells of said pair of assemblies for providing a signal having a frequency equal to the frequency of the signals produced by said detector cells and a magnitude proportional to the difference in magnitudes of the signals provided from said detector cells; and an electro-magnetic transducer coupled to said last mentioned means for converting the signal from said providing means to an audible indication of the difference in magnitude of the radiation provided at said detector cells of said pair of assemblies.

3. A navigation instrument for determining the range of an object emitting infrared radiation, including, a supporting member having a longitudinal axis and a transverse axis, a first directionally responsive infrared detector assembly mounted on said member at said longitudinal axis and on one side of said transverse axis of said supporting member, a second directionally responsive infrared detector assembly rotatably supported on said member at said longitudinal axis on the other side of said transverse axis of said supporting member, means coupled to said supporting member for obtaining a rotation of said member about said transverse axis, means coupled to said supporting member for obtaining a rotation of said member about said longitudinal axis, means coupled to said rotatable assembly for indicating the range of an object emitting infrared radiation, each of said assemblies including a detector cell sensitive to a particular narrow band of the infrared spectrum, means operative upon the radiation from the object for limiting the direction from which infrared radiation may be provided to said detector cell, means operative upon the radiation introduced to each detector cell for periodically interrupting the radiation received at said detector cell whereby the signal provided from said detector cell is an alternating signal having a magnitude proportional to the magnitude of the infrared radiation received at said cell and a frequency equal to the frequency at which the radiation at said cell is interrupted, means coupled to the interrupting means for synchronously operating said interrupting means of said first and said second assemblies, means coupled to said detector cells of said pair of assemblies for providing a signal having a frequency equal to the frequency of the signals provided from said detector cells and a magnitude proportional to the difference in magnitudes of the signals provided from said detector cells, and an electro-magnetic transducer coupled to said last mentioned means for converting the signal from said providing means to an audible indication of the difference in magnitude of the radiation provided at said detector cells of said first and second assemblies.

4. A navigation instrument for determining the range of an object emitting infrared radiation, including, a first optical system including infrared radiation reflective surfaces for providing a double image of the object, means coupled to the optical system for converting the infrared image provided from said optical system to a visual image, a second optical system for viewing said visible image, means coupled to said first optical system for adjusting the position of at least one of said reflective surfaces of said first optical system to align the portions of the double image viewable by means of said second optical system, and means coupled to said adjusting means for indicating the range of the object in accordance with the disposition of said adjusting means.

5. A navigation instrument for determining the range of an object comprising a housing assembly, including, a stationary first mirror highly reflective to infrared radiation, a second mirror highly reflective to infrared radiation and spaced from said first mirror and rotatable about the longitudinal axis of said housing, a first and a second crossed mirror highly reflective in infrared radiation positioned between said stationary mirror and said rotatable mirror with said second crossed mirror positioned above said first crossed mirror whereby each of said first and said second crossed mirrors provides only a first portion of the image provided thereto from its associated spaced mirrors, means coupled to said housing member for obtaining a rotation of said housing member, an infrared converter for providing a visual image of the infrared radiation received thereat, said converter including a detecting surface sensitive to a particular narrow band of the infrared spectrum reflected from said first and said second crossed mirrors, and an optical system coupled to said converter for magnifying the visible image provided by said infrared converter and for reducing the field of view of the infrared radiation received at said first pair of mirrors.

6. A navigation instrument for determining the range of an object emitting infrared radiation, including, first and second infrared detectors spaced along a base line, means coupled to said first detector for disabling said first detector, means effective when said first detector is disabled for providing an audible indication of the magnitude of the infrared radiation received at said second detector, means effective when said first detector is operative for providing an audible indication of the relative magnitudes of the infrared radiation received at said first and said second detectors, and means for obtaining an indication from said detectors that both detectors are simultaneously receiving infrared radiation from the same object, said last mentioned means including means for obtaining a rotation of said first and said second detectors about an axis through said base line.

7. An infrared navigation instrument, including, a pair of detector assemblies spaced along a base line, one of said assemblies being fixed with respect to said base line and the other of said assemblies being rotatable with respect to said base line; means connected to said rotatable assembly for indicating the range of an object emitting infrared radiation; each of said assemblies including a detector cell sensitive to a particular narrow band of the infrared spectrum, means operative upon the radiation from the object for limiting the direction from which infrared radiation may be provided to said detector cells, and means operative upon the radiation introduced to each detector cell for periodically interrupting such radiation whereby the signal provided from said detector cell is an alternating current signal having a magnitude proportional to the magnitude of the infrared radiation received at said cell and a frequency equal to the frequency at which the radiation at said cell is interrupted; means coupled to said interrupting means for synchronously operating said interrupting means of said pair of assemblies; and means coupled to said detector cells of said pair of assemblies for providing a signal having a frequency equal to the frequency of the signals produced by said detector cells and a magnitude proportional to the difference in magnitudes of the signals provided from said detector cells.

References Cited in the file of this patent

UNITED STATES PATENTS

| | | |
|---|---|---|
| 2,070,178 | Pottenger et al. | Feb. 9, 1937 |
| 2,237,193 | Mobsby | Apr. 1, 1941 |
| 2,423,885 | Hammond | July 15, 1947 |
| 2,431,625 | Tolson | Nov. 25, 1947 |
| 2,444,235 | Walker | June 29, 1948 |
| 2,674,155 | Gibson | Apr. 6, 1954 |
| 2,729,143 | White | Jan. 3, 1956 |
| 2,769,492 | Ostengren et al. | Nov. 6, 1956 |
| 2,830,487 | Griffith | Apr. 15, 1958 |
| 2,918,581 | Wiley et al. | Dec. 22, 1959 |
| 2,919,350 | Taylor et al. | Dec. 29, 1959 |

OTHER REFERENCES

Osborne: "Airborne Infrared Warning System Measures Range," Electronics, July 1957, pp. 190 to 192.